Oct. 3, 1967

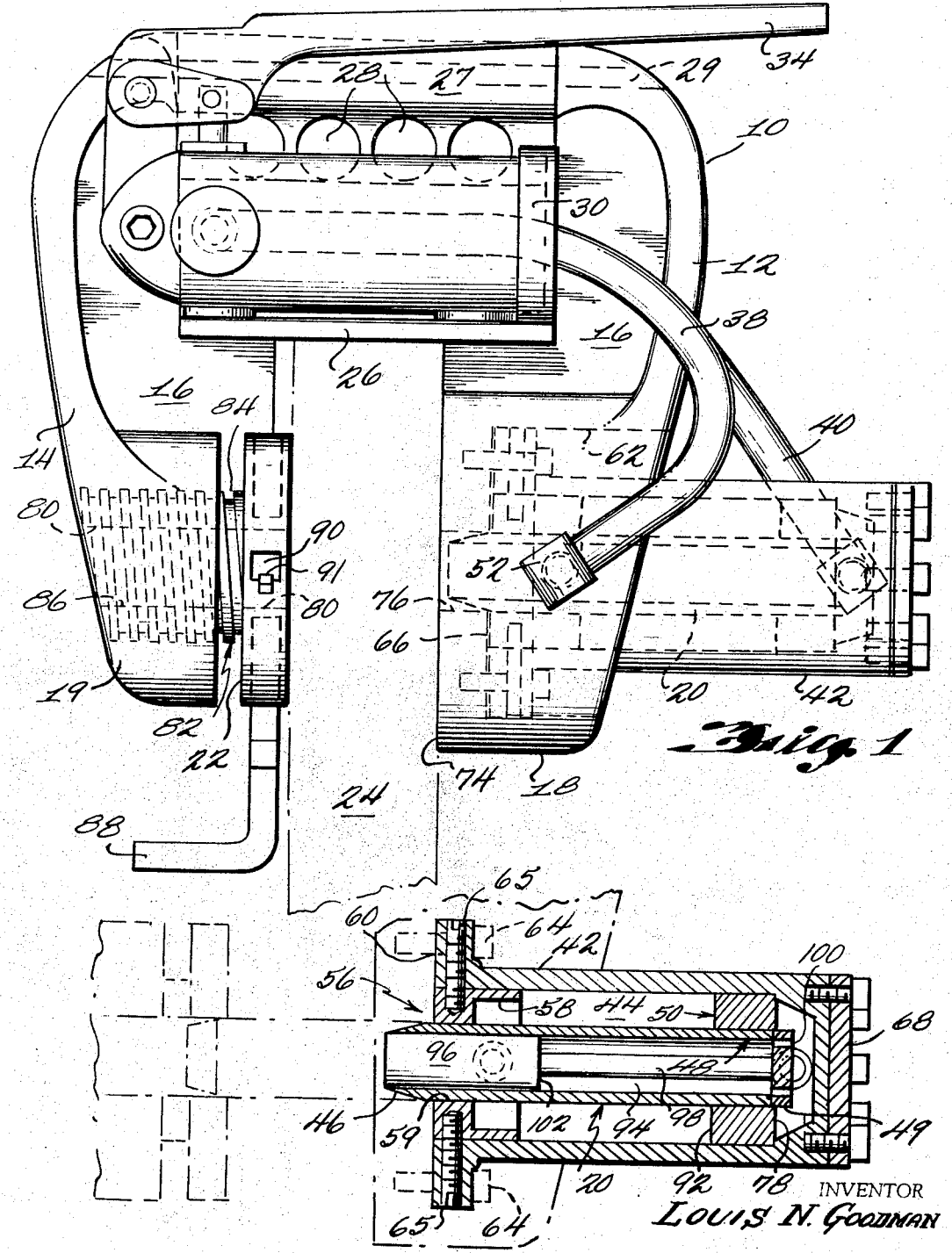

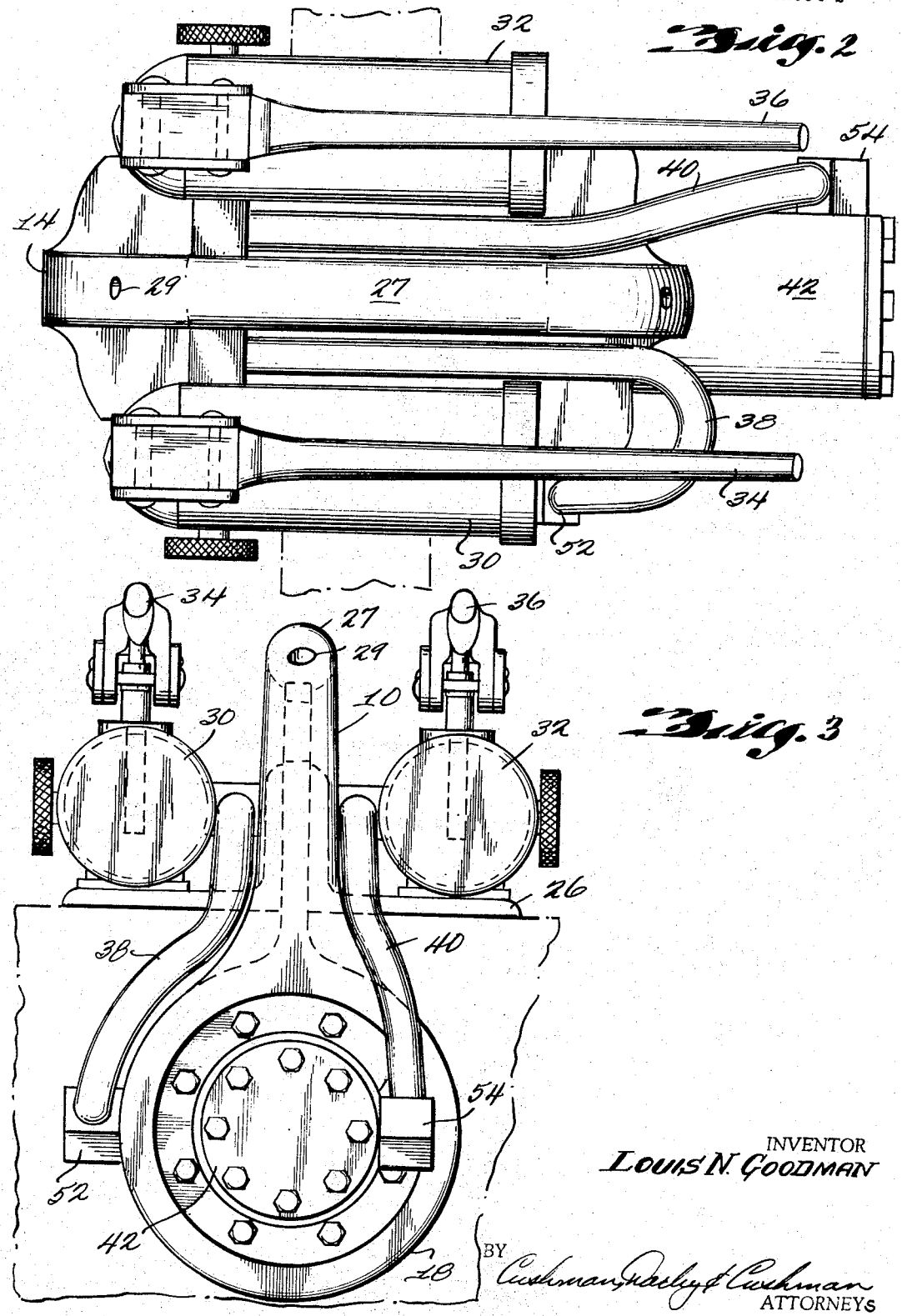

L. N. GOODMAN 3,344,519

PUNCH DEVICE

Filed Dec. 21, 1965

INVENTOR
LOUIS N. GOODMAN

BY Cushman, Darby & Cushman
ATTORNEYS

Oct. 3, 1967  L. N. GOODMAN  3,344,519
PUNCH DEVICE
Filed Dec. 21, 1965  9 Sheets-Sheet 4
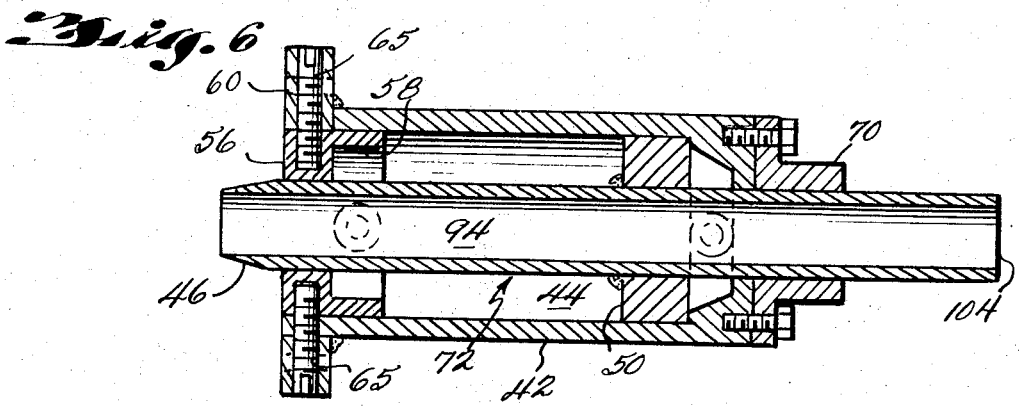
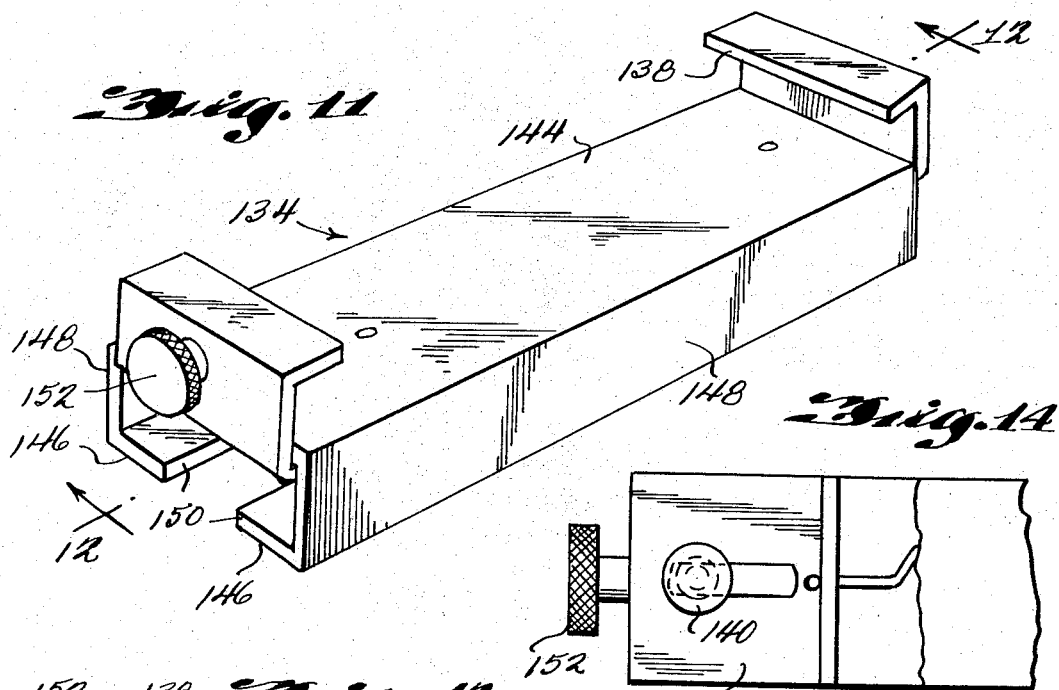
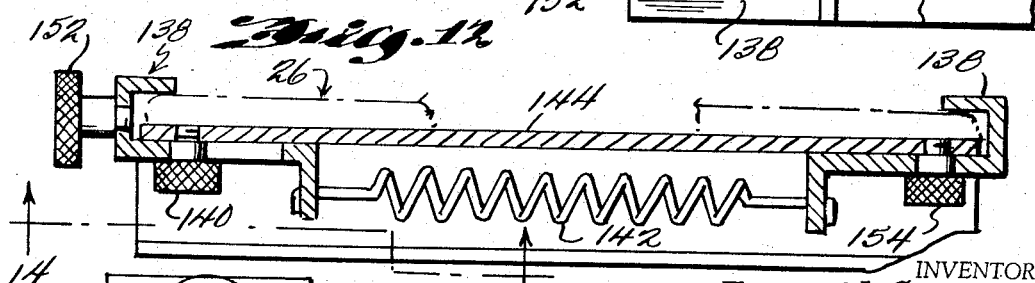
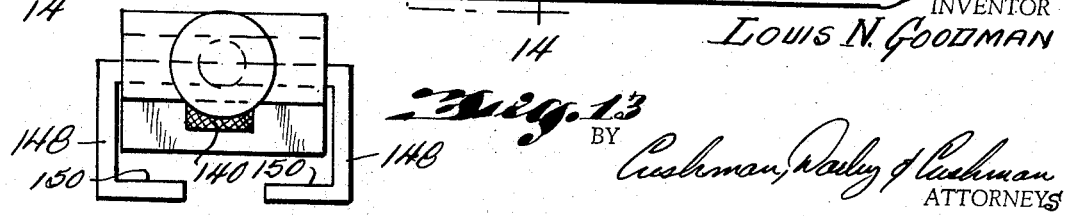
INVENTOR
LOUIS N. GOODMAN
BY
Cushman, Darby & Cushman
ATTORNEYS

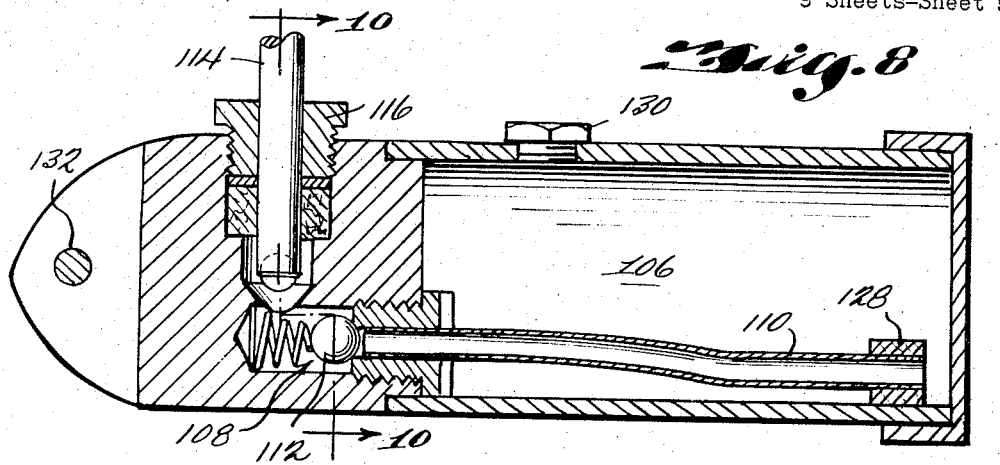
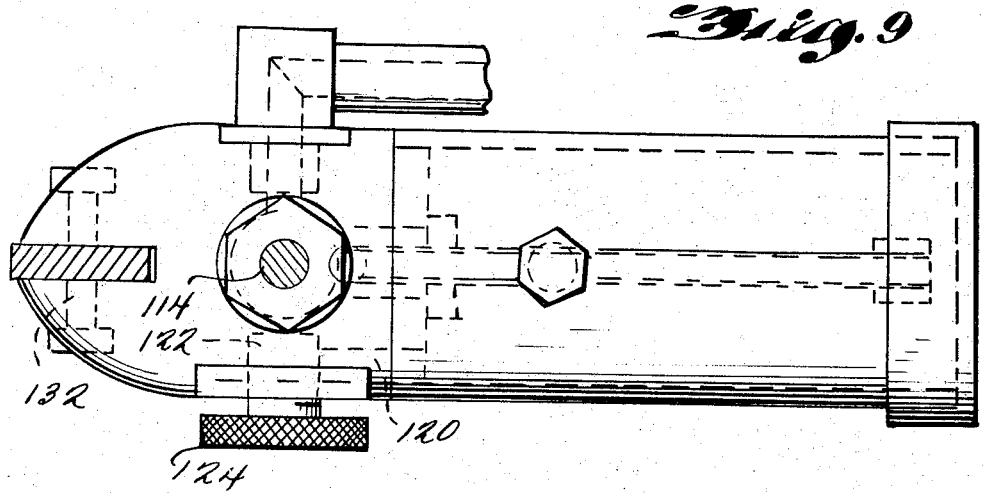
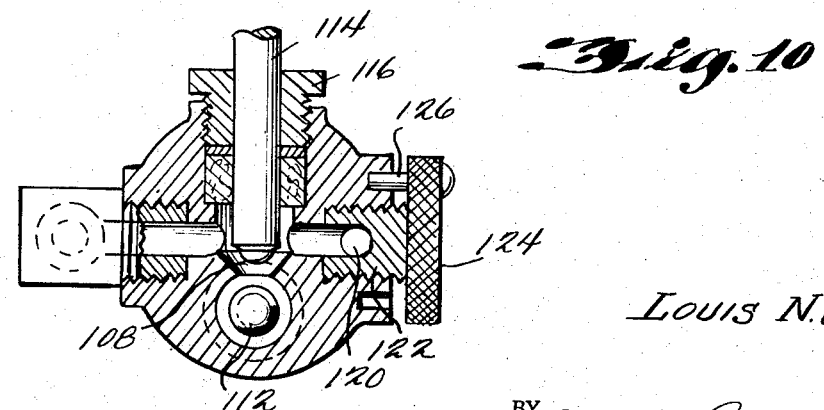

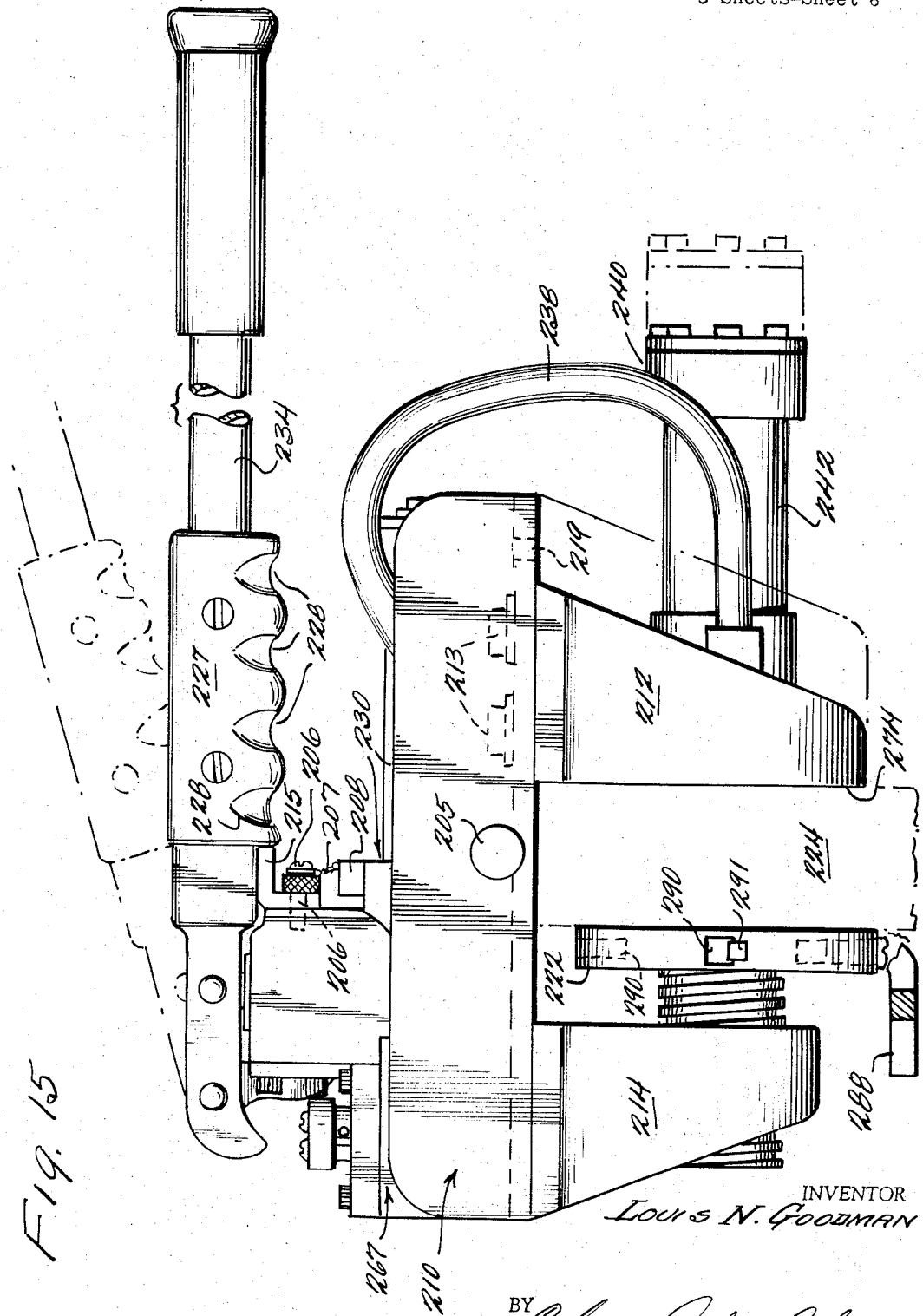

Oct. 3, 1967  L. N. GOODMAN  3,344,519
PUNCH DEVICE
Filed Dec. 21, 1965  9 Sheets-Sheet 7
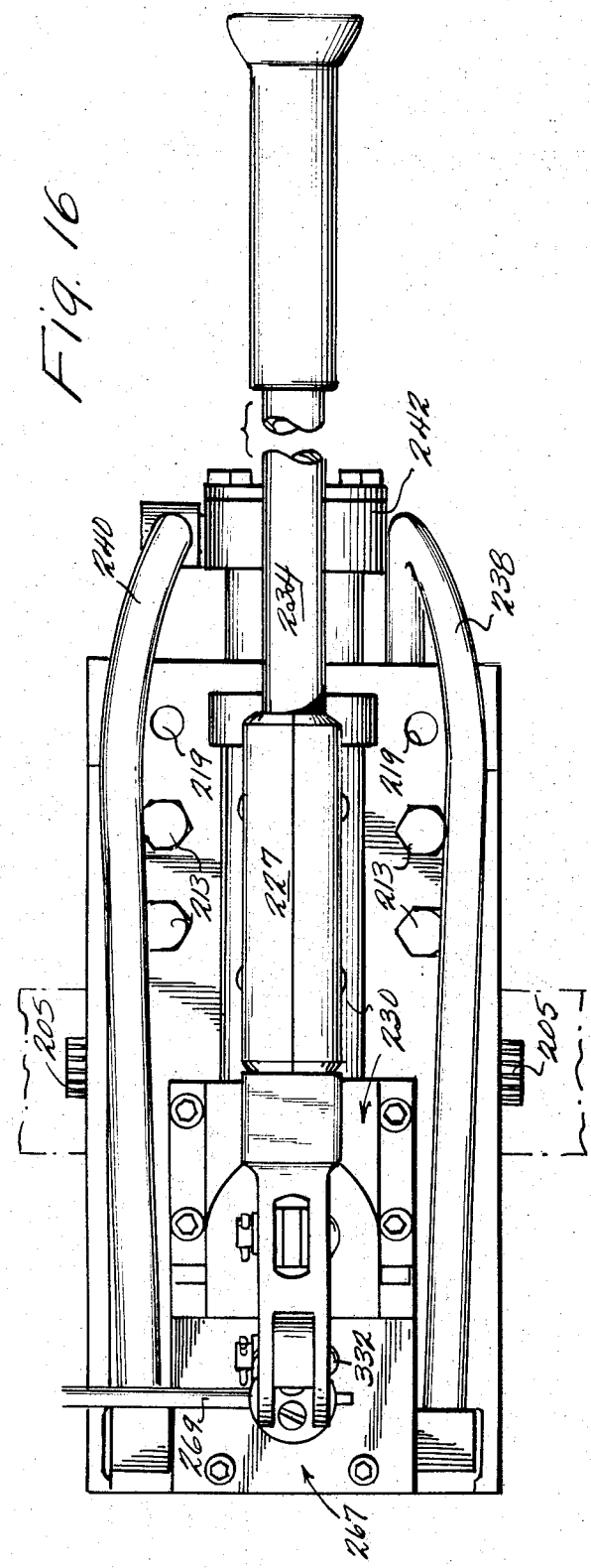
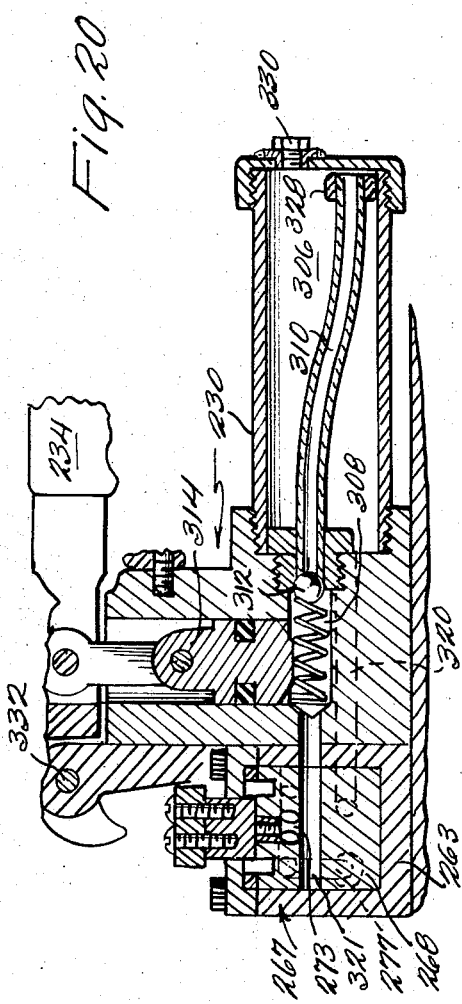
INVENTOR
*Louis N. Goodman*
BY *Cushman, Darby & Cushman*
ATTORNEYS

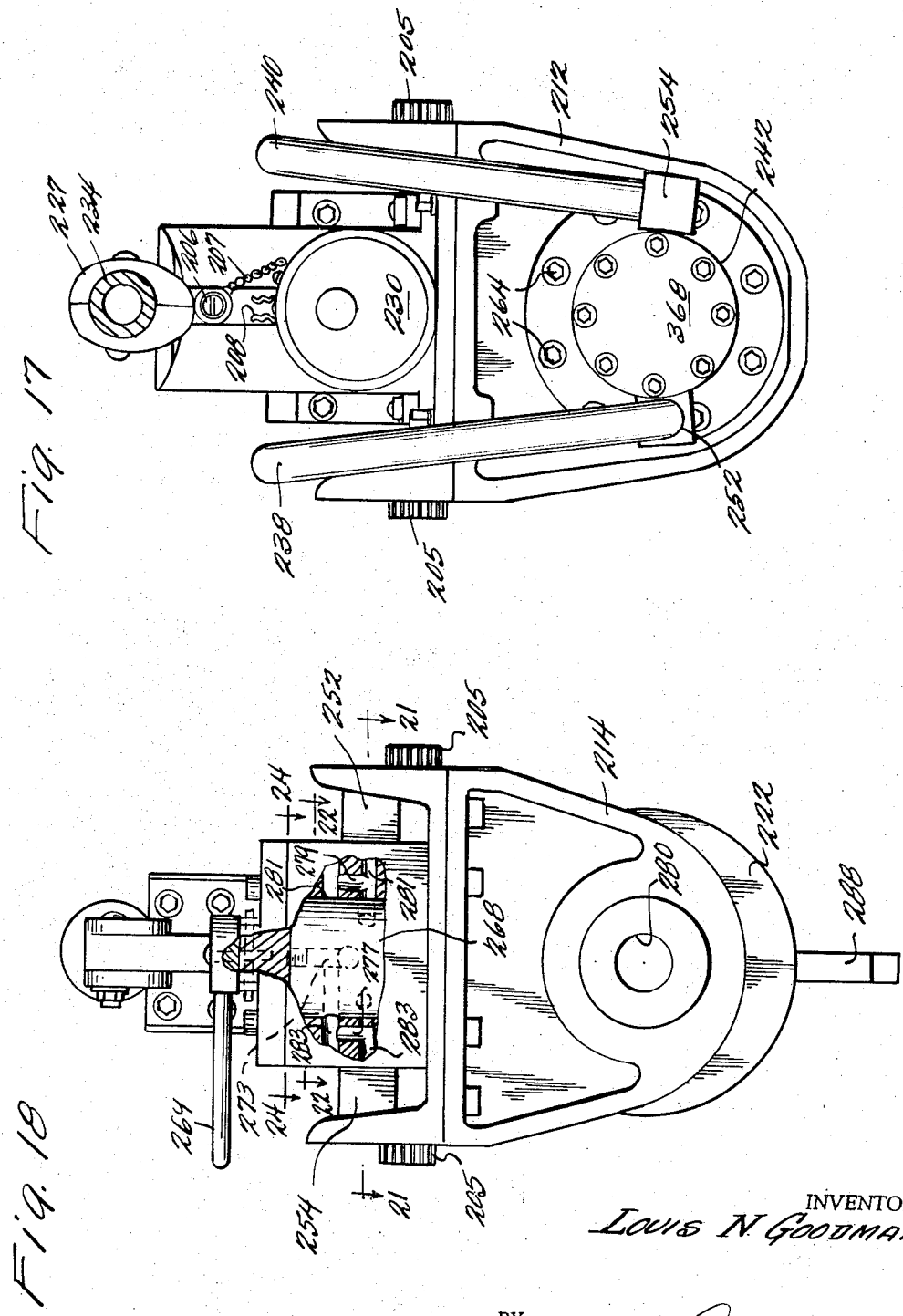

Oct. 3, 1967  L. N. GOODMAN  3,344,519
PUNCH DEVICE
Filed Dec. 21, 1965  9 Sheets-Sheet 9
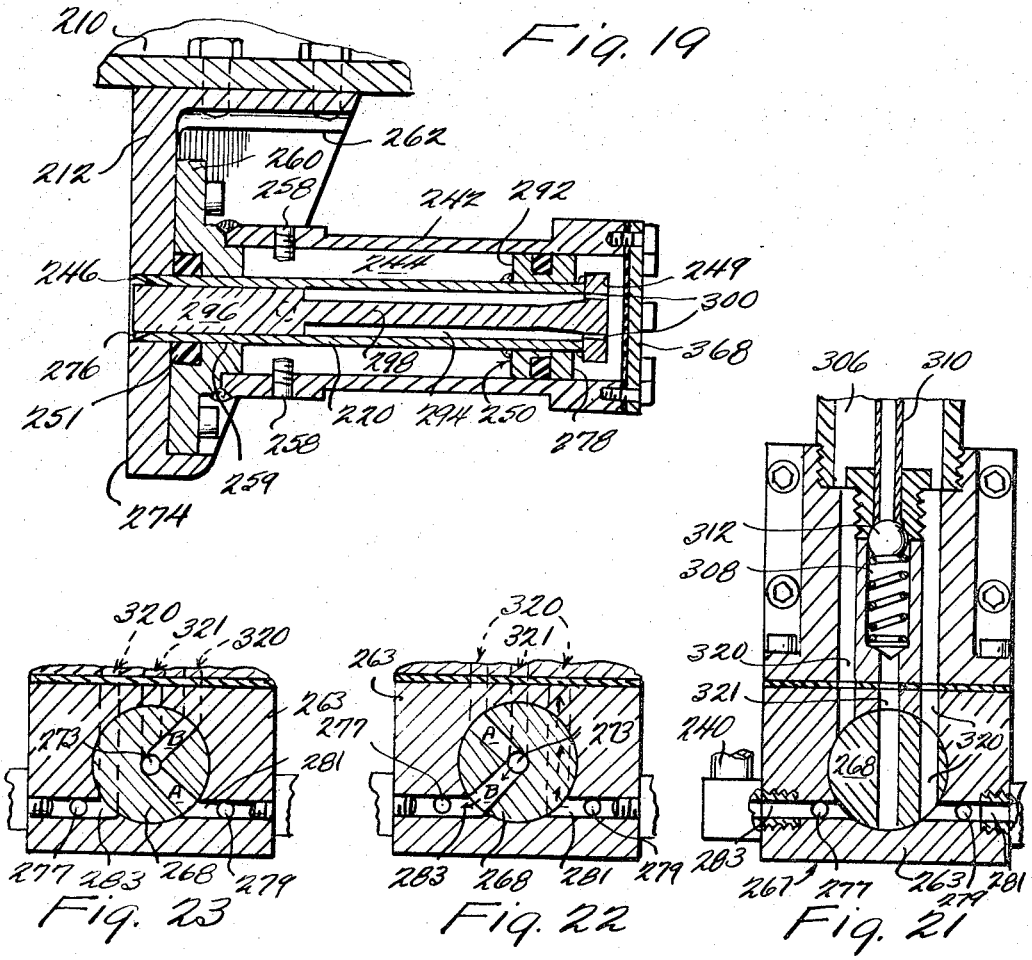
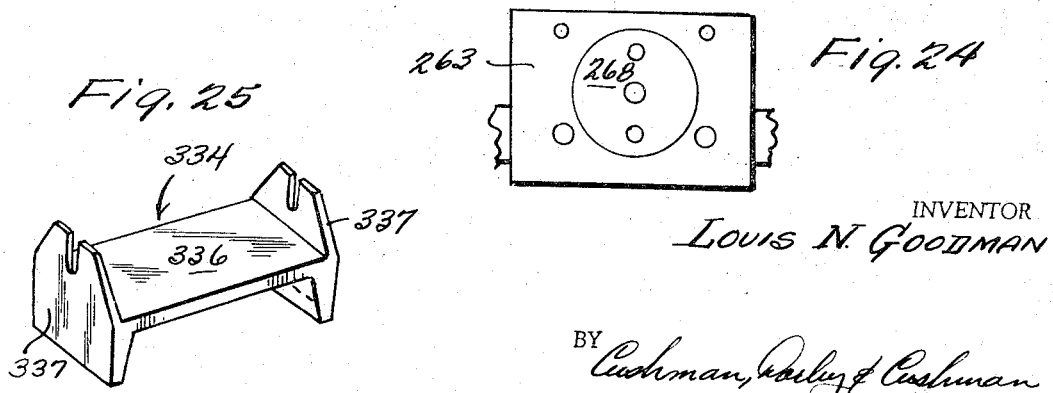
INVENTOR
LOUIS N. GOODMAN
BY Cushman, Darby & Cushman
ATTORNEYS ated Oct. 3, 1967

3,344,519
PUNCH DEVICE
Louis N. Goodman, 5510 S. Claiborne Ave.,
New Orleans, La. 70125
Filed Dec. 21, 1965, Ser. No. 522,011
6 Claims. (Cl. 30—362)

ABSTRACT OF THE DISCLOSURE

A hydraulically operated punching device is constructed to include a hydraulically actuated punch and ejector combination which provides for an initial punching action of the punch through an article and a subsequent ejecting action of the punched out core. The combination punch and ejector is mounted in a hydraulic cylinder so that both the punch and the ejector system may receive fluid pressure for operating the two separate elements relative to one another and to an article being punched. Also, an improved hydraulic pumping means is provided with a flexible tube intake duct within a hydraulic cylinder. The end of the flexible tube is weighted so that the intake duct is positioned under the surface level of hydraulic fluid irrespective of the attitude in which the hydraulic pumping means is placed.

*Background and brief description of invention*

This application is a continuation-in-part of my application Ser. No. 454,137, filed May 7, 1965, and now abandoned.

This invention relates to a fluid-actuated device for punching holes through articles, and especially through articles made of wood. More particularly, the device of this invention may be used for aligning and punching holes in wood joists and studs as found in building constructions.

The device of this invention has particular application to punching accurately aligned holes in successive joists so that an electric cable may be threaded through the holes of the joists. Prior to this invention, it has been the practice of builders to drill holes in joists or studs by hand or with electrically powered drills. Because of the limited space between successive joists, the holes are normally drilled at an angle which is not perpendicular to the plane of the wooden member. Additionally, there is a certain amount of carelessness in the drilling of holes from one joist to another, and the successive holes are usually out of alignment and at a plurality of angles to each other. As a result, it is a difficult job to string cables through such improperly aligned holes, and considerable time is lost in pulling up slackness in a cable from joist to joist.

The punch device of this invention is portable in nature and can be easily carrried to the particular joist or stud which requires a hole therethrough. The device is adapted to be placed over an exposed edge of a wood member so as to position the punched hole at a predetermined distance from the edge of the wood member. This feature permits the punching of holes through wood members at an exact distance from the edge of each wood member punched. When used for placing holes in a series of joists, a chalk line can be used to mark the line of travel desired for the electrical cable, and the hydraulic device of this invention can be used to punch perfectly aligned holes through the successive joists along the chalk line. This provides an easier job of stringing electric cable through wood members and assures greater safety in correctly placing the electric cable so that there is no danger of nails or other metal elements from being driven through the cable because of a poorly located hole for the cable. Furthermore, each hole is punched at a right angle to the plane of the wood member, and this results in better alignment of successive holes made through framing members within a partition or floor of a building.

The device of the present invention is actuated by fluid pressure and requires no external source of electrical or pneumatic power, thereby permitting the punching of holes and the installation of electrical cable prior to the availability of external power at the building site. Also, this eliminates the inherent danger to personnel which normally exists when electrical or pneumatic cables are dragged and placed throughout a building site. The device is easily actuated through the use of a self-contained fluid pump which acts to drive a hollow cutter punch through a wood member. An anvil member receives the punch upon completion of its cutting and punching action through the wood member. In one embodiment a separate fluid pump is used to return the punch to a starting position, while in a second embodiment of the invention, a single fluid pump is employed to drive the hollow punch through a wood member and to return the punch to its starting position. The cutter member of the device is positively driven by fluid pressure which is multiplied from the fluid pump means, and the cutter is driven by a piston member attached to an end of the cutter. The piston member is reciprocated within a chamber by the application of fluid pressure to one face or the other of the piston.

The invention also provides for a construction of a fluid pump, and in particular a hydraulic pump, which may be used in any attitude without affecting the flow of fluid through the pump and the performance of the pump. The pump is provided with a flexible hose within a reservoir portion of the pump and the hose is weighted at its inlet end so that the inlet will always be beneath the volume of hydraulic fluid within the reservoir irrespective of the position of the reservoir. This feature is essential in the hydraulic punch device of this invention if the punch device is to be placed in various positions and at various angles as related to a normal position for the hydraulic pump in question. With the improved construction for such a pump, it is possible to tilt the pump in any direction and still receive sufficient flow of hydraulic fluid for normal performance of the pump. In the second embodiment of this invention, a two-way gate valve construction is provided to control the operation of the single fluid pump used in that embodiment.

In addition, an ejector means is provided to remove wood plugs from the bore of the cutter. In one embodiment, the ejector means is actuated by the same fluid flow which derives the cutter means. Initially, the ejector means receives less fluid pressure than the cutter means, and the ejector is thereby prevented from being actuated until a complete cut through the wooden member has been made by the cutter means. Upon completion of a cut, the fluid pressure acting on the ejector means is sufficient to remove the wood plug which is pressed into the cutter bore during the cutting operation.

This invention also provides for a spacer bar attachment which may be easily mounted on the frame of the punch device so as to provide an adjustment of the punching position relative to the edge of a wooden member. In this manner, the series of holes punched through adjoining wooden members may be adjusted in their distances from the edges of such members. The punch device is easily carried and fitted to varying sizes of wooden members, and when once in place the punching action is accomplished with relative ease and with no danger to the user.

These and other features of this invention will become apparent from the more detailed discussion below, and the detailed discussion will make reference to the accompanying drawings in which:

FIGURE 1 is a side elevation of a first embodiment of the punch device as placed in a cutting position at the edge of a floor joist or similar wooden member;

FIGURE 2 is a top view of the same punch device showing a pair of pumps and handles for actuating the same;

FIGURE 3 is an end view of the same punch of FIGURE 1 as seen from the end carrying the punch means;

FIGURE 5 shows a cross-sectional detail of the punch means of this invention and its associated core ejector;

FIGURE 6 is a similar cross-sectional view to FIGURE 5, and shows a modified construction for ejecting cores;

FIGURE 8 is a longitudinal cross section view of the detailed construction of a preferred pumping device used with this invention;

FIGURE 9 is a top plan view of the same pumping device shown in FIGURE 8;

FIGURE 10 is a cross-sectional view taken at line 10—10 of FIGURE 8 and showing a transverse cross section of the pumping device;

FIGURE 11 is a perspective view of a spacer bar attachment;

FIGURE 12 is a longitudinal cross-sectional view of FIGURE 11 taken on line 12—12 of FIGURE 11;

FIGURE 13 is an end view of the spacer bar attachment of FIGURE 11; and

FIGURE 14 is a bottom view taken on line 14—14 of FIGURE 12;

FIGURE 15 is a side elevation of a second embodiment of the punch device as placed in a cutting position at the edge of a floor joist or similar wooden member;

FIGURE 16 is a top view of the second embodiment of the punch device showing a single pump in conjunction with an attached gate valve and handles for actuating both the pump and the gate valve;

FIGURE 17 is an end view of the second embodiment of the punch device as seen from the end carrying the punch means;

FIGURE 18 is an opposite end view to FIGURE 17 of a second embodiment of the punch device as seen from the end which carries the anvil;

FIGURE 19 shows a cross-sectional detail of a second embodiment of the punch means of this invention and its associated core ejector;

FIGURE 20 shows a longitudinal cross-sectional detail of a preferred pumping device and an associated gate valve, which are a second embodiment of an actuating means for the punch device of FIGURE 15;

FIGURE 21 is a horizontal cross-sectional view through the second embodiment of the pumping means and associated gate valve and is taken along line 21—21 of FIGURE 18;

FIGURE 22 is a horizontal cross-section through the gate valve of FIGURE 20, taken along line 22—22 of FIGURE 18, with gate valve in position for the punching means of FIG. 19 to be actuated on the punching or power stroke;

FIGURE 23 is similar to FIGURE 22 but with gate valve rotor rotated counterclockwise 180° to allow the punching means of FIG. 19 to be actuated on the withdrawal or return stroke;

FIGURE 24 is a plan through the gate valve of FIGURE 20 taken along line 24—24 of FIGURE 18; and FIGURE 25 is a perspective view of a second embodiment of a spacer bar attachment to be used only with the second embodiment of the punch device as reflected by FIGURES 15-20, inclusive.

*Detailed description of invention*

Figure 4:
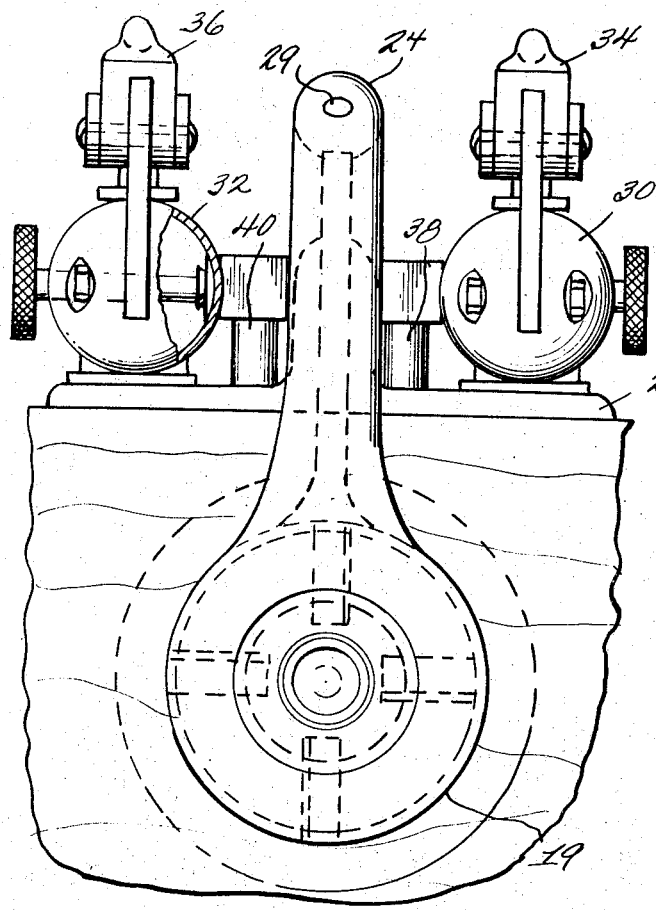
FIGURE 4 is an opposite end view to FIGURE 3 as seen from the end which carries the anvil.
Figure 7:
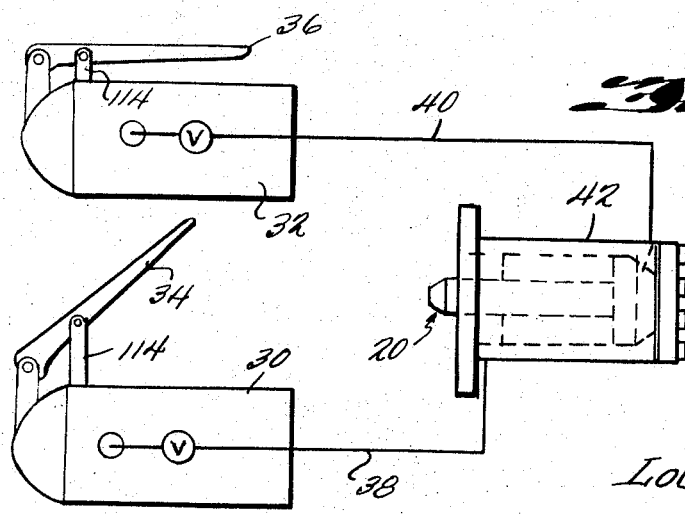
FIGURE 7 is a schematic diagram showing the fluid flow path between the two pumping means used with the FIGURE 1 embodiment and the hydraulic cutting means of this invention.

With reference to FIGURE 1 and the first embodiment of this invention, it will be seen that the punch device is portable and compact so as to be easily placed against the exposed edge of a wooden joint or similar member. The device includes a lightweight frame 10 which may be cast from high strength aluminum or any other suitable material. The frame 10 includes two outwardly extending arms 12 and 14 which project outwardly from the frame in a common plane so as to be parallel to and spaced from each other, as shown. The arms 12 and 14 are cast integrally with the remainder of the frame and these arms include cast web portions 16 for reinforcing the outwardly extending arms as related to the remainder of the frame. The arm 12 carries at its enlarged terminal end 18 a punch means 20 mounted for reciprocation toward and away from a wooden article which is to be punched. The second outward extension 14 carries at its enlarged terminal end 19 an anvil 22 which supports the punching device against a wooden member and which receives the punch means when it has completely travelled through a wooden article to form a hole therethrough. The punch means 20 and the anvil 22 are aligned with each other in their respective positions at the ends of the outwardly extending arms 12 and 14.

FIGURE 1 shows the punching device of this invention as placed for operation on the edge of a wood joist 24. The arms 12 and 14 of the frame 10 are so spaced from one another as to be placeable in opposed relationship against opposite faces of the joist 24. A flat base plate 26 is formed integrally with or welded to the web 16 and receives the exposed edge of the joist. The plate 26 permits a correct placement of the punching means as related to the edges of wooden members so that holes formed by the punch will be equally spaced from each edge of a series of wooden members. Thus each placement of the punching device against an exposed edge of a wooden joist will position the punched hole a fixed distance from the edge of the joist.

Looking to the first embodiment of the invention in greater detail, it can be seen that the frame 10 includes a handle portion 27 moulded integrally with the main body of the frame. The handle 27 may include a bore 29 throughout its length, and this may be utilized to suspend the entire device from a horizontal wire so that the device may be easily moved along the wire to a series of work positions. Such a suspension eliminates much of the overhead lifting normally required for the use of tools. Finger holes 28 are also cast in the frame so as to provide a better grip of the handle in actual use of the device. Included on the frame are two hydraulic pumping cylinders 30 and 32. These pump cylinders include piston means for multiplying the mechanical advantage of a force applied to hydraulic fluid or any other suitable fluid contained within the cylinders. The piston means are actuated manually by the levers 34 and 36, and a movement of either handle causes a movement of hydraulic fluid within the respective cylinder 30 or 32 associated with the handle. Hydraulic pressure hoses or pipes 38 and 40 communicate from the hydraulic pump cylinders 30 and 32, respectively, to a separate cylinder 42 associated with the punch means 20. The separate cylinder 42 includes the punch means 20, and receives hydraulic fluid from the cylinders 30 and 32 for reciprocating the punching means. As shown more clearly in FIGURES 5 and 6, the separate cylinder 42 includes a cylindrical chamber 44 within which the punch means 20 may reciprocate along the longitudinal central axis of the chamber. The separate cylinder 42 is of a sufficient diameter that it may include the punch means, together with a piston affixed to the punch means, for reciprocation within the cylindrical chamber of the cylinder. The punch means is shown generally at 20 and includes a cutting end 46 and an opposite end 48 which carries a piston 50 for actuating the punch. The cutting end 46 may be tapered in any suitable fashion for presenting a sharp cutting edge, but it is preferred that it be tapered by removing material on the inner periphery of the exposed end so as to form a cutting edge having the outside diameter of the tubular member 20. Suitable connections are provided at 52 and 54 to connect the high pressure hoses 38 and 40 to the chamber 44 within the separate cylinder 42. The connection at 52 permits a flow of fluid between the chamber 44 and the hose 38, and the connection 54 provides for fluid flow between the chamber 44 and the hose 40. The hoses are connected to opposite ends of the chamber 44 so that fluid pressure may be applied to opposite sides of the piston 50, as will be discussed in greater detail later. A cylindrical insert 56 is placed within one end of the cylindrical chamber 44 and this insert acts to seal the chamber at that end and also to provide a stop 58 against which the piston 50 may abut when it reaches that end of the chamber 44. The insert 56 also includes a central cylindrical bore 59 which is of a sufficient diameter to carry the punch means 20 therethrough.

The separate cylinder 42 includes a flanged end 60 for mounting in a recess 62 of the enlarged terminal end 18 of the arm 12. The flange 60 of the cylinder includes holes about its periphery for receiving bolts 64 or other devices for securing the cylinder 42 within the recess 62. As shown in the dotted lines of FIGURE 1, the recess 62 does not pass entirely through the enlarged end 18 of the frame extension. Therefore, the bottom 66 of the recess provides a flat face against which the flange 60 may be secured. Suitable internally threaded holes are made at the bottom of the recess so as to align with the bolts 64 carried through the flange 60, and the bolts 64 are used to tighten and secure the cylindrical member 42 into the recess of the frame extension 18. Additional fastening means 65 pass through the flange to secure the insert 56 within the end of the separate cylinder 42.

As shown in FIGURES 5 and 6, the cutting end 46 of the punch means normally extends outside of the separate cylinder 42 and this effects a seal at all times between the punch member and the interior of the cylinder 42. Suitable packing may be included in the bore 59 of the insert 56 to provide a further sealing means between the insert and the punch means which is reciprocated through it. In the FIGURE 5 embodiment the opposite end of the separate cylinder 42 is sealed by an end plate 68. In the alternative embodiment of FIGURE 6, a different type of end plate 70 is used to accommodate travel of the modified punch member 72 through that end of the cylinder.

From the above descriptions, it can be seen that the cylinder 42 and the punch means 20 are mounted at the end of the frame extension 18 so as to operate the punch on an axis at right angles to the surface of a wood member 24 which brought into engagement with a face 74 of the enlarged portion 18. The face 74 may be serrated or roughened so as to present a better frictional contact between the face and a wooden member against which it is brought. In its inactive position, the punch 20 is within the confines of the enlarged terminal end 18, but a bore 76 through the face 74 permits travel of the punch toward an adjoining wooden member. The bore 76 communicates with the recess 62 and is in alignment with the longitudinal axis of the punch. The punch is actuated by the application of fluid pressure to one side or the other of the piston 50 within the chamber 44. Fluid pressure may be applied to a back surface 78 of the piston 50 through the pressure hose 40 which is in communication with the actuating cylinder 32. Movement of the handle 36 causes fluid pressure to be relayed to the back face 78 of the piston, and this causes the piston with its punch member 20 to be carried toward the anvil 22. Manual movement of the handle 36 results in a mechanical advantage which causes the piston and punch to continue in their forward movement as long as pressure is applied to the handle. The mechanical advantage is so multiplied that the punch 20 presses its way through the wooden joist 24. Preferably the punch 20 is in the form of a hollow tubular cutting device, as shown, and as the punch moves through a wooden article a plug of wood is cut from the article. When the cutter punch reaches its forwardmost position, as determined by the stop 58, the punch will have traveled entirely through the wooden member contained between the outward extensions 18 and 19. A bore 80 through the center of the anvil 22 is aligned with the punch and is of a sufficient diameter to receive the cutting end of the punch when the punch reaches its outermost position.

The anvil 22 is preferably mounted for adjustment on the enlarged end 19 so that it may be moved toward and away from the face 74 of the opposite extension member 18. This adjustment feature permits the placement of the hydraulic punch device over articles having varying thicknesses, and the anvil can be adjusted to bring the two outward extensions into tight engagement with the article to be punched. The face of the anvil which contacts the wood article is also preferably serrated or roughened to provide a better engagement of the anvil against the article. The anvil is shown in FIGURE 1 as being carried by a shaft 82 which is preferably hollow so as to receive plugs of wood ejected from wooden articles being punched. The shaft 82 is provided with square external threads 84 so as to be threadably received by matching internal threads within a bore 86 through the outward extension member 19. Thus, the anvil may be threaded toward and away from an article embraced between the outward extension 18 and 19. An anvil handle 88 is provided to adjust the anvil 22, and suitable slots 90 are placed about the peripheral surface of the anvil for receiving an end of the handle 88. By placing the handle in a convenient slot, force may be applied to the handle to turn the anvil tightly against any surface which is to be punched. In addition, a friction spring 91 is included within each slot 90. This friction spring is in the form of a flat steel spring which is normally biased against the end of the handle placed within a slot 90. The purpose of the spring is to hold the handle within the slot for any position of the handle about the periphery of the anvil. At the same time, the spring permits a removal of the handle when desired by the application of sufficient force outwardly away from the periphery of the anvil to overcome the friction of the spring against the handle.

Once the punch 20 has passed completely through an article, it will fit tightly within the hole made by its pressing movement through the article. The reason for this is that during the movement of the punch through the article a certain amount of wood material is compressed radially outwardly, and this material exerts considerable force against the outside surface of the punch. Accordingly, it is necessary to apply a considerable force to return the punch to its beginning position. This is provided by hydraulic fluid pressure applied to a front surface 92 of the piston 50. When the operating lever 34 is actuated, fluid passes into the chamber 44 through the hose 38 so as to apply a pressure against the face 92 of the piston 50. Continued application of this pressure causes the punch means 20 to be removed from the hole which it has just made and to be returned to its beginning position for punching another hole.

Since the punch means 20 is preferably in the form of a tubular member having a cutting end 46, the core of wood which is removed by the punch means will initially fill the hollow interior 94 within the tubular cutting punch. Therefore, it is necessary to provide for removal of the plug of wood from within the punch so that subsequent operations may be made with the same tubular cutting member. A preferred form of removal means is shown in FIGURE 5, in the form of a hydraulically actuated ejector 96. This ejector means is actuated by the same fluid flow which moves the piston and its affixed punch forward for a punching action. It is desirable that the ejector be delayed in its action until the cutting member has completely traveled through the article to be punched, and therefore, the hydraulic actuation of the ejector means does not become effective until the tubular cutting punch has completely traversed the article. The ejector means 96 is shown in the form of a cylindrical element or piston fitted within the cylindrical bore 94 of the tubular punch, and the ejector 96 is arranged for reciprocation within that bore. As shown in the FIGURE 5 position, the cylindrical element is initially positioned at the cutting end 46 of the tubular member and completely within the bore of the tubular member at that end. The ejector cylinder or piston 96 includes a shaft 98 affixed to the rear end of the cylinder element as shown in FIGURE 5. The shaft 98 is cylindrical in form and is terminated by a cylindrical head 49 of larger diameter than that of the inner bore of punch 20. The end 49 is also provided with ports 100 for admitting hydraulic fluid to the interior of the tubular cutter and against the back face 102 of the ejector 96. Thus, when hydraulic fluid is pumped into the separate cylinder against the surface 78 of piston 50, some of the fluid enters the tubular cutter through the ports 100 and applies a pressure against the back face 102 of the ejector means. The exposed surface area of the back face 102 of the cylinder element is considerably less than the total exposed surface area of the piston face 78. As a result, when the piston 50 is moved by the application of hydraulic pressure, the core ejector cylinder 96 does not receive sufficient pressure to initially overcome the resistance of the core which is being cut by the travel of the tubular cutting member through a wooden article. However, when the tubular cutting member has completely passed through the wooden article, the wood core is no longer attached to any part of the wooden article and is entirely contained within the cutting end of the tubular member. At that point, the wooden core presents less resistance than when it was still attached to the remainder of the wooden article, and the hydraulic pressure on the back surface 102 of the cylindrical core ejector, plus the pressure on the cross-sectional area of the end of the plug ejector piston shaft 98, is sufficient to eject the core of wood from the tubular member. This ejection takes place automatically upon a completion of a hole through the article being punched, and the ejected plug of wood falls into the hollow portion 80 of the anvil shaft contained within the enlarged portion 19 of the arm 14. When the ejector has ejected a plug of wood, the punch and the ejector are returned together to their initial position by the movement of the piston 50 to its starting position.

An alternative construction for a punch means is shown in FIGURE 6 wherein no separate ejector is required to remove wooden plugs contained within the tubular cutting member 72. The tubular cutting member of this embodiment includes a complete bore through the entire length of the punch, and this permits travel of wooden plugs from the cutting end of the member toward the opposite end of the tubular member. Thus as each subsequent punch is made with this cutting member the previously cut plugs of wood will be forced rearwardly away from the cutting end of the tubular member. Ultimately the wooden plugs will be forced to drop out from rear end 104 of this tubular cutting member. This construction requires a modification of the sealed end 70 of the separate cylinder 42. Instead of a flat sealing plate 68, as was used in the FIGURE 5 embodiment, it is necessary to provide an end plate 70 with a bore therethrough for permitting reciprocal movements of the tubular member through the bore. The bore is of a sufficient size to receive the tubular member, and the end plate of this embodiment may include suitable packing or sealing means within the bore to prevent leakage of the high pressure hydraulic fluid used to actuate the cutting member.

FIGURES 8 through 10 show the detailed construction of the improved hydraulic actuator pumps 30 and 32 used with this invention. As shown in FIGURE 8, the pump includes a main reservoir chamber 106 which contains sufficient hydraulic fluid to fill the high pressure hose leading to the separate cylinder 42 and to fill a portion of the separate cylinder as required to actuate the piston 50 within that cylinder. A smaller reservoir 108 within the actuator pump communicates with the main reservoir through a flexible duct 110. The smaller reservoir includes a spring-loaded ball valve 112 which normally closes the communication between the small reservoir 108 and the main reservoir 106. In operation, the ball valve 112 is displaced to an open position when the associated lever 34 or 36 is lifted so as to draw a piston member 114 upwardly and away from the small reservoir 108 with which the piston communicates. The piston member 114 and its position within the hydraulic actuator pump is well known in the art and suitable sealing means 116 are provided for holding the piston in communication with the small reservoir 108 and for reciprocation into and out of that reservoir. As the piston is drawn upwardly, hydraulic fluid is drawn through the duct 110 and past the ball valve 112 into the small reservoir. Upon completion of upward travel of the piston, the spring 118 forces the ball valve back to its normally closed position so that fluid contained within the small reservoir may not drain back into the large reservoir. With the valve closed and the small reservoir filled with hydraulic fluid, the actuator is ready to pump fluid for actuating the punch means. Fluid is pumped by a downward movement of the appropriate lever 34 or 36 associated with the particular hydraulic actuating cylinder, and this downward movement forces the piston 114 into the small reservoir. Since the small reservoir is sealed from the main reservoir by the ball valve, the fluid is displaced through the high pressure hose which connects the small reservoir with the separate cylinder 42. It should be understood that the high pressure hoses are also filled with hydraulic fluid during all operations of the actuators. The displaced fluid fills the interior chamber 44 of the separate cylinder on one side or the other of the piston 50 so as to cause the piston to move in reaction to the hydraulic pressure. As discussed above, actuation of the hydraulic pump 30 causes the piston 50 to move rearwardly away from the anvil 22, and actuation of the hydraulic pump 32 causes the piston to move forwardly toward the anvil 22. When one of the hydraulic actuating cylinders has been used to move the piston 50, the second of the actuating cylinders must be used to return the piston to its starting point. Before the piston 50 can return to an initial position, it is necessary to allow hydraulic fluid to flow back into the hydraulic actuating cylinder which caused the movement away from the initial position. The ball valve 112 prevents a return of fluid from the small reservoir 108 back into the main reservoir 106. Therefore, a by-pass 120 is provided to allow fluid to flow into the main reservoir without going through the duct 110. The by-pass 120 is normally closed when a particular hydraulic pump is being operated. However, when an opposing hydraulic pump is actuated, the by-pass in the first cylinder is opened by the manually operated valve 122. This valve is connected to a knob 124 which may be rotated 180° to open or close the valve 122 connected to the knob. A pin 126 is carried by the knob and follows a semi-circular groove which determines the 180° limit of movement for the valve. Suitable indicating means may be stamped on the outside surface of the pump wall to indicate the closed and open positions for the by-pass as related to the position of the pin 126. When the second hydraulic pump has completed its movement of the punch and excess fluid from the chamber 44 has returned to the first hydraulic actuating cylinder, the by-pass valve of the first cylinder is closed and that cylinder is in condition for a subsequent pumping operation. Looking to the flexible duct 110 in the hydraulic actuating cylinder, it can be seen that the duct is provided with a weight 128 at its outer end which is also the inlet for fluid from the reservoir into the duct. The combination of a flexible duct and the weight provides for a pumping of hydraulic fluid from the main reservoir irrespective of the attitude of that reservoir. Normally the reservoir is not completely full, and when turned upside down or tilted, there would be positions where oil would not pass through the ball valve 112 without the provision of the long flexible duct. The weight 128 at the end of the flexible duct causes the inlet end to fall beneath the hydraulic fluid contained within the reservoir for all positions of the reservoir. This feature is important to the successful operation of the present invention because it permits the hydraulic punch device to be used in any position against any article to be punched. Other details of the hydraulic actuating cylinder include a fluid filler cap 130 and a suitable linking pin 132 which connects the actuating lever to the actuating cylinder. Also, suitable linkages are provided to connect the actuating lever to the piston member 114 which it reciprocates.

FIGURE 11 shows a perspective view of a spacer bar attachment 134 which may be mounted on the base plate 26 of the FIGURE 1 embodiment for the purpose of adjusting the distance that a hole will be made from an exposed edge of an article. Spacer bar attachments may be provided in a number of sizes so as to allow fixed and predetermined adjustments of the position of the hydraulic wood punch device as placed against various articles. The spacer bar attachment generally includes a main body portion 136 and separately attached end flanges 138. One of the flanges 138 is adjustable relative to the end of the body portion and can be fixed in a position relative to the body portion by the thumb screw device 140 so that it may be pulled outwardly to be fitted around the base plate 26. The flanges are held against the main body 136 of the spacer bar attachment by a spring 142 which is connected at its terminal ends to the opposing flanges, and by the thumb screw 154. The body 136 includes an upper surface 144 for engagement with the bottom surface of the base plate 26, and a bottom surface 146 spaced from the upper surface 144. The bottom surface 146 is formed by downturned members 148 which turn downwardly for the fixed distance which is desired to adjust the position of the hydraulic cutting device. The downturned members also include inwardly turned portions 150 which provide the flat surface which will be placed against the wooden joist or other member being cut. A gripping screw or knob 152 is carried by one of the flange members 138 for ease in engaging an edge of the base plate 26 when the spacer bar is mounted on the base plate. The flange members 138 may be easily removed from any given body member and affixed to another body member having a different dimension for the downturned portions 148. Thus a number of spacer bar body portions 136 may be utilized with a single set of flange devices or each spacer bar body may have its own set of flange devices to adjust the position of the hydraulic wood punch as related to the article being punched.

In operation, the hydraulic punch device is placed against the exposed edge of a wooden article so as to position the outwardly extending arms 12 and 14 on opposite sides of the wooden article. The hydraulic punch device is pushed toward the article in this position until the base plate 26 abuts against an exposed edge of the article to be punched. This places the punch member a predetermined distance from the edge of the article, and as suggested above, this distance can be adjusted by interposing varying sizes of spacer bar attachments 134 between the base plate and the exposed edge of the wooden member. In this initial position the punch member is contained entirely within the enlarged portion 18 of the arm 12, and hydraulic fluid completely fills the recess 44 of the separate cylinder 42 on both sides of the piston 50. Also hydraulic fluid completely fills the pressure hose 40 leading to the actuating cylinder 32, and the pumping cylinder 32 includes sufficient oil or hydraulic fluid to move the piston 50 to its outermost position against the stop member 58. Movement of the piston is effected by a downward movement of the lever 36 associated with the hydraulic pumping cylinder 32. This downward movement moves the piston 114 pivotally connected to the lever 36, and relays pressure from the surface of that piston to the hydraulic fluid contained within small reservoir of the pumping cylinder 32. As the piston 50 within the separate cylinder 42 is moved outwardly by fluid pressure the cutting member carried by the piston is likewise moved outwardly and through the wooden article being punched. Upon completion of the outward travel of the piston, sufficient fluid pressure within the tubular punch 22, of the FIGURE 5 embodiment, permits actuation of the core ejector 96. Then the second operating lever 34, associated with the second actuating cylinder 30, is moved to return the cutting member to its initial position. During the forward movement of the cutting member, hydraulic fluid contained within the recess 44 of the separate cylinder is forced through the high pressure hose 38 and into the main reservoir within the second pumping cylinder 30. Accordingly it is necessary that the fluid volumes in the two cylinders be such that forward and return movement of the piston 50 is possible with the associated flow of fluid through the hoses 38 and 40 to the separate cylinder 42. A downward movement of the lever 34 of the second pumping cylinder 30 forces a piston 114 to apply pressure to the hydraulic fluid within the small reservoir of that pump and ultimately to the front face 92 of the piston 50. As the punch member is returned to its initial position, the core ejector associated therewith is likewise carried back to its initial position as shown in FIGURE 5. No relative movement of the core ejector to the tubular cutting member is necessary on this return reciprocation of the cutting member because the core ejector assumes the position shown relative to the cutting edge of the tubular member upon ejecting a wooden plug from the bore of the tubular member.

Normally the punch device is used for punching standard two-inch wood joists, however, if a four-inch double joist is encountered it is possible to punch half-way through the double joist from one direction and then to reverse the punch device so as to complete the cut from the opposite direction through the double joist. Of course, where such a two step cutting operation is required, it is preferable to mark a guide line on the double joist so that the punch can be properly aligned when it is reversed for the second half of the cut.

A second embodiment of the invention is illustrated in FIGURE 15, and in this form of punch device a single operating lever serves to both advance and retract a cutter through a wood joist or similar article. The advantages in this construction reside in the ease of construction and operation of the device, and the second embodiment of the punch device will perform all of the operations of the first embodiment.

Referring to FIGURES 15, 16, 17 and 18, it can be seen that the device includes a frame 210 which is similar to the frame 10 of FIGURE 1. The frame 210 may be cast from high strength aluminum or other material, or it may be formed from a piece of standard size and weight aluminum, or other metal, channel. The frame 210 includes two downwardly extending arms 212 and 214, and these two arms are individually cast and then bolted to the frame 210. As seen in FIGURE 15, the arm 212 may be bolted to the frame 210 in one of two positions so as to accommodate varying thicknesses of material between the two arms. The extended position for the arm 212 is obtained by removing the bolts 213 and replacing them in the holes 219, and in this manner the arms 212 and 214 can be adjusted to accept thicknesses of wood material of up to 2¾ inches in the illustrated position and up to 4 inches in the extended position.

As with the first embodiment, the punch device of FIGURE 15 also includes a punch means 220 mounted for reciprocation toward and away from a wooden article to be punched. Likewise, an anvil 222 is carried at an end of the arm 214, and the anvil receives the punch means 220 when the punch means has completely travelled through a wood article. In the FIGURE 15 illustration, the punch device is shown in a working position relative to a wood joist 224, and for this position the arms 212 and 214 are placed on opposed faces of the wood joist. In the second embodiment there is no separate base plate 26 (FIGURE 1) for contacting an edge of a joist, but the flat underface of the frame 210 serves the same function.

In the second embodiment, the carrying handle for the device and the operating lever for pumping hydraulic fluid are incorporated into the same member 234. When the device is to be carried to a new location, the lever arm 234 can be locked into the FIGURE 15 position by inserting a pin 206 through the angle clip 215 which is secured to the lever arm 234. The pin 206 is easily removed from the locked position and stored in a spring clip 208 attached to a housing of actuator pump 230. In its preferred form, the pin 206 is connected to a chain 207 so that it won't be dropped and lost during use, and the chain 207 may be anchored on the housing of the pump 230. A hand grip 227 is attached to the operating lever 234, and the hand grip may be formed from mating elements of plastic or metal which provide finger grips 228 when assembled. The hand grip 227 is positioned along the lever arm 234 at the approximate center of gravity of the entire device so that the device can be carried in a balanced manner.

A single hydraulic pumping device 230 is employed with the FIGURE 15 embodiment, and this device utilizes a manually operated two-way gate valve 267 to control the flow of hydraulic fluid to and from a separate cylinder means 242 which actuates the punch means 220. The separate cylinder means 242 is equivalent in construction and operation to the separate cylinder 42 of the FIGURE 1 embodiment, and similar parts of the separate cylinder means of the FIGURE 15 embodiment have been labeled with reference numerals raised by 200 over the reference numerals of FIGURES 5 and 6 of the first embodiment. However, in the second embodiment, as shown in FIGURE 19, the stopping means 58 of FIGURE 5 has been replaced by steel pins 258 which are arranged at 90 degrees around the periphery of the cylinder 242, and these pins provide the same function. As with the first embodiment, the separate cylinder 242 carries a flange 260 which can be bolted to the arm 212.

As shown in FIGURE 19, the cutting end 246 of the punch means normally extends outside of the separate cylinder 242 and this effects a seal at all times between the punch member and the interior of the cylinder 242. Suitable packing 251 may be included in the bore 259 of the flange 260 to provide a further sealing means between the insert and the punch means which is reciprocated through it. The opposite end of the separate cylinder 242 is sealed by an end plate 368.

From the above descriptions, it can be seen that the cylinder 242 and the punch means 220 are mounted at the end of the arm 212 so as to operate the punch on an axis at right angles to the surface of the wood member 224 which is brought into engagement with a face 274 of the arm 212. The face 274 may be serrated or roughened so as to present a better frictional contact between the face and a wooden member against which it is brought. In its inactive position, the punch 220 is within the confines of the face 274 but a bore 276 through the face 274 permits travel of the punch toward an adjoining wooden member. The bore 276 communicates with a recess 262 and is in alignment with the longitudinal axis of the punch. As in the first embodiment of the invention, the punch is actuated by the application of fluid pressure to one side or the other of the piston 250 within the chamber 244. Fluid pressure may be applied to a back surface 278 of the piston 250 through the pressure hose 240 which is in communication with the actuating cylinder 230. Movement of the handle 234, in a manner to be described, causes fluid pressure to be relayed to the back face 278 of the piston, and this causes the piston with its punch member 220 to be carried toward the anvil 222. Manual movement of the handle 234 results in a mechanical advantage which causes the piston and punch to continue in their forward movement as long as pressure is pumped by the handle. The mechanical advantage is so multiplied that the punch 220 presses its way through the wooden joist 224.

Comparing the second embodiment of this invention with the first embodiment it can be seen that the single actuator pump 230 of the second embodiment performs the same functions as the two separate pumps 30 and 32 of the first embodiment. The operation of the single actuator pump 230 is substantially the same as that of either pump 30 or 32, but the single pump 230 is able to perform both functions through the control feature of a gate valve assembly 267 used in combination with the pump. The gate valve assembly 267 is shown in various positions of operation in FIGURES 20 through 24, and these figures indicate an output port 321 and return ports 320 leading out of and into the actuator pump reservoir 306.

Referring to FIGURE 20, the means for pumping hydraulic fluid to and from the actuator pump 230 is illustrated with respect to the gate valve assembly 267 and the pump lever 234. The pump lever 234 can be operated in up and down movements about a pivot point 332, and such movements cause a reciprocation of the piston element 314 which is linked to the pump lever arm 234. Reciprocation of the piston element 314 withdraws hydraulic fluid from the reservoir 306, through the conduit 310, and into small reservoir area 308 which adjoins the larger reservoir 306. The spring mounted ball valve 312 assures a one way flow of fluid from the large reservoir 306 and into the small reservoir 308 for each upward stroke of the piston element 314. After a quantity of hydraulic fluid is drawn into the small reservoir 308 by an upward movement of the lever arm 234, the lever arm is then pressed downwardly to force that quantity of hydraulic fluid through the gate valve assembly 267. Initially, the hydraulic fluid enters the gate valve assembly through the port 321 which serves as an outlet from the small reservoir 308. From there the hydraulic fluid is caused to flow through either the hose 238 or the hose 240, depending upon the position of the valve means 268 which is associated with the gate valve assembly 267. For one position of the valve means 268 there is a forward flow of hydraulic fluid from the actuator pump 230 to one side of the piston element 250 contained within the separate cylinder 242. For a second position of the valve means 268 there is a forward flow of hydraulic fluid to an opposite side of the piston member 250 which is contained within the separate cylinder 242. For each flow path of hydraulic fluid, there is also provided a return flow for fluid which is being returned to the actuator pump 230 by the forward or backward movement of the piston 250 within the separate cylinder 242. As with the first embodiment construction, the flexible conduit 310 is weighted at 328 so that the receiving end of the conduit will be below the level of hydraulic fluid within the reservoir 306, irrespective of the attitude of the punch device.

The gate valve assembly, as illustrated in FIGURE 20 through 24, includes a body block 263 of high strength aluminum or other suitable metal and a rotatable valve member 268 fitted within the block. The body block 263 has port means 320 and 321 at different levels for providing a return and an outlet, respectively, to and from the actuator pump means 230. Separate port means 281 and 283 are formed to communicate between the rotatable valve means 268 and the separate hoses 238 and 240, respectively. The port means 281 and 283 are formed by drilling horizontal passages at two levels into the block 263, and the two levels of horizontal passage are innerconnected by vertical bores 277 and 279. In this manner, hydraulic fluid can flow between the upper level of the port 321 and the lower level of the two hoses 238 and 240. All of the ports which are drilled or formed in the block 263 of the gate valve assembly are positioned to provide a flow path between the actuator pump 230 and opposite sides of the piston means 250 contained within the separate cylinder 242. The valve means 268 is made up of a cylindrical metal member which is fitted into a circular recess of the block body 263. The valve means 268 includes drilled horizontal ports A and B which branch out from a vertically drilled port 273 so as to form a communication between the horizontal port 321 and the lower horizontal ports 281 and 283 of the valve block 263. Also connecting means are provided between the valve means 268 and the valve operating handle 269 so that the valve can be turned into one of two positions by rotating the handle 180 degrees. Limit means are provided in association with the handle and valve structure for limiting the range of movement to the required 180 degrees of rotation. Also, gasket means and other sealing devices are used to effect a leakproof seal between the rotatable valve means 268 and the remainder of the valve gate assembly 267. Also, a straight passage 320 is drilled through the valve means 268 for communication with one of the two passages 320 formed in the valve block, as seen in FIGURE 21.

With reference to FIGURES 22 and 23, it can be seen that the valve means 268 of the gate valve assembly can be manually turned by the handle 269 to one of two positions. In the position of the valve means illustrated in FIGURE 22, there is provided a flow path of hydraulic fluid which conducts fluid pressure from the actuator pump 230 through the outlet port 321, and then up the central port 273 in the valve means 268 for a flow through the port 283 and to the hose 240. This flow path provides a power stroke to the pump device for advancing the pump through an article. As hydraulic fluid is emitted through the hose 240 into the separate cylinder 242, the piston 250 is advanced toward the article to be pumped. While the piston means 250 is advanced through the separate cylinder means 242, a flow path must be provided for a return of hydraulic fluid from the left-hand side of the piston as viewed in FIGURE 15 to the reservoir of the actuator pump 230. This return flow is made through the hose 238 which communicates with a port 281 in the block 263 of the gate valve assembly. When the valve means 268 is in the position illustrated in FIGURE 22 for a power stroke, the port 281 is in open communication with the return port 320 for returning hydraulic fluid into the actuator pump 230.

With the gate valve handle 269 moved counterclockwise 180 degrees from the just described position, the valve means 268 assumes the position shown in FIGURE 23. When the valve means is in this position, a hydraulic flow path is provided through the ports 321 and 281 for a flow through the hose 238 and into the forward end of the separate cylinder 242. This flow of hydraulic fluid applies a positive pressure to the left-hand side of the piston means 250, as viewed in FIGURE 15, and causes a retraction of the punch member into its initial starting position within the cylinder means 242. Successive operations of the handle 234 of the actuator pump 230 pumps sufficient hydraulic fluid against the piston 250 to accomplish the requisite movement of the pump back to its starting position. During this rear stroke of the piston 250, hydraulic fluid which is contained against the rear face 278 of the piston 250 is returned to the reservoir 306 by way of the hose 240 and the ports 283 and 320 of the gate valve. After this return stroke is completed, the gate valve is in a position for a subsequent pumping operation.

FIGURE 25 shows a second embodiment of a spacer bar attachment 334 to be used with the second embodiment of the wood punch device. This spacer bar attachment 334 may be provided in a number of sizes so as to provide for an adjustment of the distance that a hole will be punched when the punch device with its spacer bar attachment is placed against an exposed edge of a wooden article. The main body 336 of the spacer bar attachment has end plates 337, and the entire attachment may be made from standard aluminum channel and sheet elements which are welded together to form the body and the end plates. In use, the body portion 336 is placed under the frame 210 of the punch device with upwardly directed slots in the end plates 337 being engaged under the heads of retaining screws 205 mounted on the exterior of the punch device frame 210.

In the operation of the second embodiment of this invention, the hydraulic pump device is placed against the exposed edge of a wooden article so as to position the arms 212 and 214 on opposed faces of the wooden article. The entire device is pushed toward the article in this position until the underside of the frame 210 between the arms 212 and 214 abuts against the exposed edge of the article. This places the punch member at a predetermined distance from the edge of the article, and as previously suggested, this distance can be adjusted by interposing varying sizes of spacer bar attachments 334 between the base plate and the exposed edge of the wooden member. In this initial position, the punch member is contained entirely within the cylinder 242, and hydraulic fluid completely fills the recess 244 of the pumping cylinder 242 on both sides of the piston means 250. Also, hydraulic fluid completely fills the pressure hoses 258 and 240 leading to the actuator pump 230, and the gate valve assembly associated therewith. The reservoir 306 is also filled with a sufficient amount of hydraulic fluid to provide a necessary quantity of fluid for pumping to the separate chamber 242.

Once the entire punch device is in place against the member to be punched, the lever 234 is manually actuated to cause a pumping of fluid past the gate valve assembly 267 and into the hose 240. For this pumping action, the gate valve is set in the position shown in FIGURE 22 so that the flow of fluid will provide for an advancement of the punch cutter through the wooden member. As the piston 250 within the separate cylinder 242 is moved outwardly by fluid pressure, the tubular cutting member carried by the piston is likewise moved outwardly and through the wooden article to be punched. During the outward movement of the tubular cutting member, a core of wood becomes emplaced within the tubular cutter and against the core ejector 296. As with the first embodiment of the invention, the core ejector does not function until the tubular cutting member has completed its cut and a sufficient hydraulic pressure is applied to the core ejector to force the core of wood out of the tubular cutting member. Upon completion of the punching operation, the gate valve handle 269 is turned to a position which provides the flow path of FIGURE 23, and this flow path causes a return movement of the punch member to its starting position. During the return movement of the tubular cutting member to its initial position, the core ejector is likewise carried back to its initial position as shown in FIGURE 19.

Although this invention has been described with reference to preferred embodiments of the hydraulic device, variations will become obvious to those having ordinary skill in the art and such variations are intended to be included within the scope of the claims of this invention. Also, the invention has been described with reference to punching holes through wood joist members, but the device is also useful for punching holes into relatively soft materials such as fiberboards, plywoods, and plastic sheets.

What is claimed is:
1. A hydraulic punch device comprising:
   a frame means having two outwardly extending arms for placement against opposite surfaces of an article to be punched,
   hydraulic pumping means carried by said frame for pumping hydraulic fluid to and from a separate hydraulic cylinder carried by one of said outwardly extending arms,
   a tubular punch means carried within said separate hydraulic cylinder, said punch means including a cutting end projecting out from said separate hydraulic cylinder, a piston carried by said punch, said piston being mounted for reciprocal movements within said separate hydraulic cylinder,
   an ejector means carried within said tubular punch means for ejecting plugs of material out of a bore of said tubular punch means, said ejector means being operable for ejecting actions by the same source of fluid pressure which operates said punch means,
   an anvil carried by the second of said two outwardly extending arms, said anvil being aligned with the tubular punch means so as to receive the tubular punch means upon movement of the punch through the article, and
   communication means between said hydraulic pumping means and opposite ends of said separate cylinder for carrying hydraulic fluid to the opposite ends of the interior of said cylinder whereby hydraulic pressure may be applied to opposite sides of the piston so as to actuate the piston and its punch toward and away from an article contained between the two outwardly extending arms.
2. The punch device of claim 1 wherein said hydraulic pumping means includes an actuating cylinder for containing hydraulic fluid to be pumped to and from said separate cylinder means, a lever and piston means for pumping hydraulic fluid to and from said separate cylinder means, and a two-way valve means for diverting the flow of fluid to said separate cylinder means in a first flow path for advancing said punch means through an article to be punched, and in a second flow path for retracting said punch means from the article which is punched.
3. The punch device of claim 2 wherein there is provided in said actuating cylinder a flexible duct means for receiving and carrying hydraulic fluid out of the cylinder, said flexible duct means having a weight attached to its terminal inlet end, whereby the weighted inlet end of said duct will remain beneath the hydraulic fluid contained within said hydraulic cylinder irrespective of the attitude of said punch device.
4. The punch device of claim 1 wherein said anvil means includes a central bore for receiving plugs of material ejected by the punch means.
5. The punch device of claim 4 wherein said anvil means includes adjustment means for moving the anvil means toward and away from the surface of an article against which it is placed.
6. The punch device of claim 1 wherein said ejector means comprises:
   a cylindrical member carried within a bore of said tubular cutter for pushing plugs of article material out of the bore of said cutter, and
   communication ports into the bore of said cutter member for admitting fluid into said bore and against said cylindrical member whereby fluid under pressure may actuate the ejector within the bore, said communication ports being in fluid communication with an interior portion of said separate cylinder which receives fluid pressure when said tubular punch is being advanced toward an article to be punched.

References Cited
UNITED STATES PATENTS

| | | | |
|---|---|---|---|
| 532,265 | 1/1895 | Cornell | 60—52 |
| 1,757,828 | 5/1930 | Beckert | 144—196 |
| 2,536,709 | 1/1951 | Ashton et al. | 30—361 |
| 2,796,906 | 6/1957 | Buckley | 83—686 X |

DONALD R. SCHRAN, *Primary Examiner.*